(12) United States Patent
Julkunen

(10) Patent No.: US 10,192,305 B2
(45) Date of Patent: Jan. 29, 2019

(54) METHOD AND SYSTEM FOR ANALYZING TEST IMAGE

(71) Applicant: VISUALMIND OY, Kouvola (FI)

(72) Inventor: Veli-Pekka Julkunen, Espoo (FI)

(73) Assignee: VISUALMIND OY, Kouvola (FI)

( * ) Notice: Subject to any disclaimer, the term of this patent is extended or adjusted under 35 U.S.C. 154(b) by 0 days.

(21) Appl. No.: 15/612,197

(22) Filed: Jun. 2, 2017

(65) Prior Publication Data

US 2018/0350052 A1 Dec. 6, 2018

(51) Int. Cl.
*G06T 7/00* (2017.01)
*G06K 9/46* (2006.01)
*G06Q 30/02* (2012.01)

(52) U.S. Cl.
CPC ............ *G06T 7/001* (2013.01); *G06K 9/4609* (2013.01); *G06T 7/97* (2017.01); *G06K 2209/19* (2013.01); *G06Q 30/0241* (2013.01); *G06T 2207/10004* (2013.01)

(58) Field of Classification Search
CPC . G06T 7/001; G06T 7/97; G06T 2207/10004; G06K 9/4609; G06K 2209/19; G06Q 30/0241

USPC .......................................................... 382/170
See application file for complete search history.

(56) References Cited

U.S. PATENT DOCUMENTS

2007/0244742 A1* 10/2007 Short ................... G06Q 10/063
705/7.28

* cited by examiner

*Primary Examiner* — Amandeep Saini
(74) *Attorney, Agent, or Firm* — Ziegler IP Law Group, LLC

(57) ABSTRACT

A method executed by one or more processors for analyzing at least one test image. The method includes collecting a plurality of reference images from at least one image source, extracting image features from the plurality of reference images, assigning weights to the image features extracted, determining image scores for the plurality of reference images, iteratively performing the assigning of the weights and the determining of the image scores, extracting image features from the at least one test image, assigning weights to the image features of the at least one test image, determining an image score for the at least one test image, based upon the weights assigned to the image features of the at least one test image, and providing an improvement proposal for the at least one test image, based upon the image score determined for the at least one test image.

23 Claims, 9 Drawing Sheets

METHOD AND SYSTEM FOR ANALYZING TEST IMAGE

TECHNICAL FIELD

The present disclosure relates generally to analysis of images; and more specifically, to methods and systems for analyzing images. Furthermore, the present disclosure also concerns computer program products comprising a non-transitory machine-readable data storage medium having stored thereon program instructions that, when accessed by a processing device, cause the processing device to execute the aforesaid methods

BACKGROUND

Generally, companies and retailers of products and/or services are required to communicate with a large audience to inform them about the products and/or services offered. Usually, audiovisual media is employed for such communication, for example, through advertisements, marketing material, informational websites, social media marketing campaigns and so forth. Moreover, a substantial amount of such communication utilizes visual communication therein, for example, through use of images that can be associated with the companies and retailers. For example, a company associated with automobile repair services may employ images associated with types of services offered by the company (such as, in an advertisement) and/or images of various automobiles that the repair services are offered therefor.

Conventionally, selection of images for such communication is made by one or more marketing professionals of the company. However, such selection of images is usually associated with a lack of important information to support the selection. Consequently, the selection is made based on subjective feelings of the professionals regarding an effectiveness of the selected images. However, the selected images may not deliver the required effectiveness on the audience, thereby leading to substantial financial losses for the company. For example, the financial losses may be associated with advertising costs, charges for employing services of the professionals, lack of sales due to poor impact of the communication, and so forth. Furthermore, use of improper images for such communication may lead to a lack of consumer trust towards the company, thereby causing additional problems for the company. For example, such lack of consumer trust may damage a brand identity of the company and may further reduce sales of the products and/or services offered by the company.

Therefore, there exists a need to overcome the aforementioned drawbacks associated with selection of images for visual communication.

SUMMARY

The present disclosure seeks to provide a method executed by one or more processors for analyzing at least one test image. The present disclosure also seeks to provide a system comprising one or more processors for analyzing at least one test image. The present disclosure seeks to provide a solution to the existing problem associated with selection of images for visual communication. An aim of the present disclosure is to provide a solution that overcomes at least partially the problems encountered in prior art, and provides a robust, scalable and efficient method and system for analyzing images.

In one aspect, an embodiment of the present disclosure provides a method executed by one or more processors for analyzing at least one test image, the method comprising:

(a) collecting a plurality of reference images from at least one image source;

(b) extracting image features from the plurality of reference images;

(c) assigning weights to the image features extracted at the step (b);

(d) determining image scores for the plurality of reference images, wherein an image score for a given reference image is determined based upon the weights assigned to image features present in the given reference image;

(e) iteratively performing the assigning of the weights at the step (c) and the determining of the image scores at the step (d), wherein, for a given reference image, iterations of the assigning of the weights at the step (c) and the determining of the image score at the step (d) are performed based upon a comparison between the image score and ranking data of the given reference image;

(f) extracting image features from the at least one test image;

(g) assigning weights to the image features of the at least one test image, based upon the weights assigned to the image features at the step (e);

(h) determining an image score for the at least one test image, based upon the weights assigned to the image features of the at least one test image; and (i) providing an improvement proposal for the at least one test image, based upon the image score determined for the at least one test image.

In another aspect, an embodiment of the present disclosure provides a system comprising one or more processors for analyzing at least one test image, wherein the system comprises a data processing arrangement of software modules executing on the one or more processors, and wherein the system is operable to:

(a) collect a plurality of reference images from at least one image source;

(b) extract image features from the plurality of reference images;

(c) assign weights to the image features extracted at (b);

(d) determine image scores for the plurality of reference images, wherein an image score for a given reference image is to be determined based upon the weights assigned to image features present in the given reference image;

(e) iteratively perform the assigning of the weights at (c) and the determining of the image scores at (d), wherein, for a given reference image, iterations of the assigning of the weights at (c) and the determining of the image score at (d) are to be performed based upon a comparison between the image score and ranking data of the given reference image;

(f) extract image features from the at least one test image;

(g) assign weights to the image features of the at least one test image, based upon the weights assigned to the image features at (e);

(h) determine an image score for the at least one test image, based upon the weights assigned to the image features of the at least one test image; and (i) provide an improvement proposal for the at least one test image, based upon the image score determined for the at least one test image.

Embodiments of the present disclosure substantially eliminate or at least partially address the aforementioned problems in the prior art, and enables robust and efficient analysis of images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
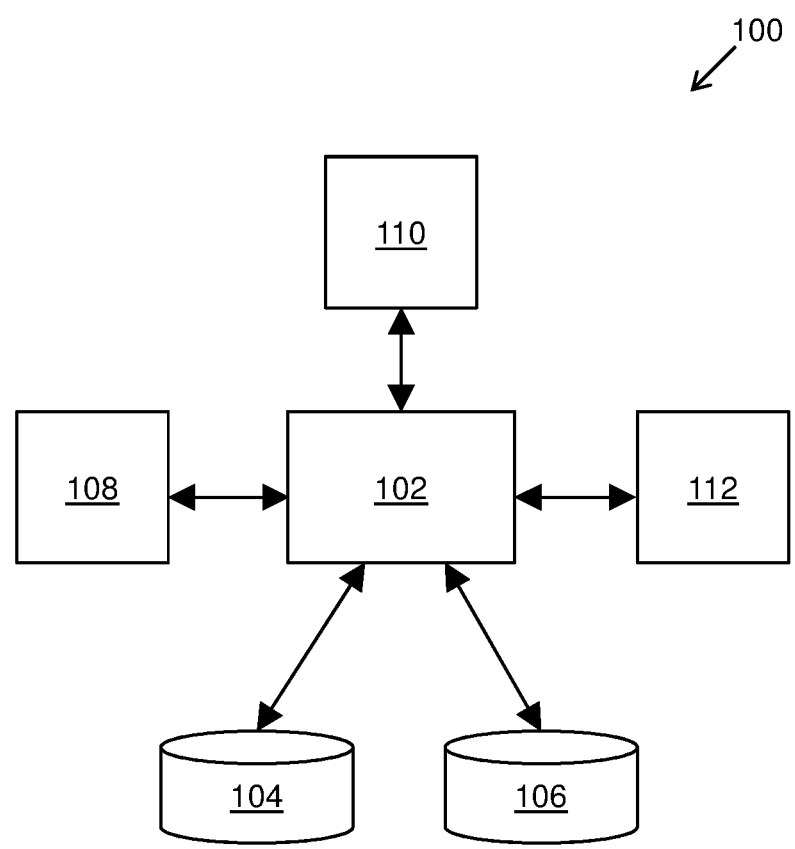
FIG. 1 is an illustration of an example network environment in which the system for analysing at least one test image is implemented, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method executed by one or more processors for analyzing at least one test image, the method comprising:

(a) collecting a plurality of reference images from at least one image source;

(b) extracting image features from the plurality of reference images;

(c) assigning weights to the image features extracted at the step (b);

(d) determining image scores for the plurality of reference images, wherein an image score for a given reference image is determined based upon the weights assigned to image features present in the given reference image;

(e) iteratively performing the assigning of the weights at the step (c) and the determining of the image scores at the step (d), wherein, for a given reference image, iterations of the assigning of the weights at the step (c) and the determining of the image score at the step (d) are performed based upon a comparison between the image score and ranking data of the given reference image;

(f) extracting image features from the at least one test image;

(g) assigning weights to the image features of the at least one test image, based upon the weights assigned to the image features at the step (e);

(h) determining an image score for the at least one test image, based upon the weights assigned to the image features of the at least one test image; and (i) providing an improvement proposal for the at least one test image, based upon the image score determined for the at least one test image.

In another aspect, an embodiment of the present disclosure provides a system comprising one or more processors for analyzing at least one test image, wherein the system comprises a data processing arrangement of software modules executing on the one or more processors, and wherein the system is operable to:

(a) collect a plurality of reference images from at least one image source;

(b) extract image features from the plurality of reference images;

(c) assign weights to the image features extracted at (b);

(d) determine image scores for the plurality of reference images, wherein an image score for a given reference image is to be determined based upon the weights assigned to image features present in the given reference image;

(e) iteratively perform the assigning of the weights at (c) and the determining of the image scores at (d), wherein, for a given reference image, iterations of the assigning of the weights at (c) and the determining of the image score at (d) are to be performed based upon a comparison between the image score and ranking data of the given reference image;

(f) extract image features from the at least one test image;

(g) assign weights to the image features of the at least one test image, based upon the weights assigned to the image features at (e);

(h) determine an image score for the at least one test image, based upon the weights assigned to the image features of the at least one test image; and (i) provide an improvement proposal for the at least one test image, based upon the image score determined for the at least one test image.

The method comprises collecting a plurality of reference images from at least one image source. The images source may include at least one of, but not limited to, portable devices (such as cameras, mobile phones, wearable devices and so forth), internet, websites offering royalty-free media (including photos, videos and so forth), third party service providers and so forth. For example, the plurality of reference images includes images captured by users of mobile phones using a camera associated therewith. In another example, the plurality of reference images includes images in a database associated with a third party service provider offering stock photos for sale. It will be appreciated that the plurality of reference images can be collected from multiple image sources. In one example, the image source is in communication with the one or more processors, such as, using a communication network. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Throughout the present disclosure, the term "image" encompasses a still image as well as an image frame of a video. It will be appreciated that a video comprises a sequence of multiple image frames, namely images appearing at specific instants of time in the video. In one embodiment, the plurality of reference images comprises image frames extracted from at least one video. In an example, in a video having duration of 1 minute and 10 seconds, image frames appearing at 36 seconds, 52 seconds and 1 minute 5 seconds can be extracted to comprise the reference images. This is potentially beneficial in cases where multiple consecutive image frames of the same video are only slightly different from each other. However, it will be appreciated that more image frames of the video can be extracted, when required. In another example, the plurality of reference images comprises all image frames of the video. Pursuant to embodiments of the present disclosure, for a given test video, at least one test image is extracted from the given test video for analysing using the aforementioned method.

In an embodiment, the method further comprises collecting metadata associated with the plurality of reference images from at least one image source. For example, the metadata comprises at least one of a title, location (such as a universal resource locator), time and so forth associated with the plurality of reference images.

The method comprises extracting image features from the plurality of reference images. It will be appreciated that the plurality of reference images will be different from one another and therefore, will have different image features. In an embodiment, the image features comprise technical features, object-oriented features, object-detail features, and/or scene-based features. In an example, the technical features of the plurality of reference images comprise a colour scheme of the image, image contrast, sharpness of the image and so forth. In such instance, an image of the plurality of reference images may use a greyscale colour scheme whereas another image may be a coloured image. In another example, the object-oriented features of the plurality of reference images comprise different objects within the reference images. For example, a reference image of a vehicle driving on a road will have different object-oriented features (such as one or more vehicles, road signs and so forth) as compared to a reference image of a sports stadium (such as players, sports equipment, fans and so forth).

In yet another example, the object-detail features of the one or more reference images comprise details associated with one or more objects within a reference image. For example, two images of a person taken at different times will depict the person displaying different facial emotions, such as, the person may be smiling in one image and the person may have an anxious emotion in the other image. In one example, the scene-based features of the plurality of reference images comprise details of objects with respect to other objects within the image. For example, an image of a luxury vehicle driving on an old road is associated with scene-based feature of the luxury vehicle with respect to the scene of the old road.

In an embodiment, extracting of the image features comprises dividing a given image into a plurality of sub-images, and analyzing the plurality of sub-images to identify the image features present therein. In an example, the given image is divided into the plurality of sub-images based on the objects within the image. For example, an image associated with premium apparel is divided into sub-images based on presence of black colour and/or one or more lustrous surfaces included therein. In another example, an image of a natural setting is divided into sub-images based on presence of green colour, depiction of greenery (such as plants or trees) and/or depiction of water therein.

According to an embodiment, the image features are extracted automatically using feature recognition algorithms. In an example, the feature recognition algorithms comprise artificial intelligence algorithms. Additionally and optionally, the feature recognition algorithms comprise deep learning feature recognition algorithms. For example, one or more features, such as persons within an image, are extracted using facial recognition algorithms, pattern recognition algorithms and so forth. In another embodiment, the image features are extracted using numerical methods. For example, the one or more features are extracted using statistical analysis, colour analysis, contrast analysis and so forth. Alternatively, the image features are extracted manually.

The method comprises assigning weights to the image features extracted. The weights assigned to the image features indicates a significance of the image feature with respect to an overall theme represented by the image. In an example, an image of a farm setting with a 'natural' theme comprises a tractor vehicle located within the farm. In such instance, the image feature of the tractor vehicle will be assigned a low weight as compared to other features (such as one or more crops growing on the farm) as it does not contribute to the overall 'natural' theme of the image. However, it will be appreciated that the image feature of the tractor vehicle may be assigned a different weight in an instance when the theme of the image is different. For example, if the image has an 'industrial' theme, the image feature of the tractor vehicle is assigned a higher weight as compared to other features of the image.

In an embodiment, the method further comprises classifying the image features into a plurality of feature groups based upon mutually different genres to which the plurality of reference images and/or the at least one test image belong. In one example, an image of a premium restaurant comprises image features including food, dinnerware, furniture, people (such as patrons of the restaurant), interior décor of the restaurant and so forth. In such instance, some of the image features such as the dinnerware, furniture, interior décor and so forth can be classified into a feature group such as 'modern' and/or 'urban' whereas image features such as food, dinnerware, interior décor and so forth can be classified into feature groups such as 'eco-friendly' and 'luxury'. Subsequently, image features extracted from other reference images and/or the at least one test image can be classified into the feature groups 'modern', 'urban', 'eco-friendly' and 'luxury'.

According to one embodiment, the method further comprises predefining the plurality of feature groups in a manner that the plurality of feature groups are understandable and interpretable by humans, wherein a given feature group is indicative of a theme that is visually communicated by a given image. In an example, the plurality of feature groups is predefined based on image features that are extracted from a plurality of reference images. In such instance, the plurality of feature groups comprise a list that is updated, for example, by addition of new feature groups based on image features extracted from new images. Moreover, the plurality of feature groups is so defined to enable understanding and interpretation of a theme that is visually communicated by a given image that is classified into that feature group. For example, the feature groups 'modern', 'urban', 'eco-friendly' and 'luxury' are indicative of a 'premium' theme that is visually communicated by the image of the premium restaurant.

The method comprises determining image scores for the plurality of reference images, wherein an image score for a given reference image is determined based upon the weights assigned to image features present in the given reference image. In an example, images of eco-friendly workplaces comprise image features such as workspaces, electrical equipment, furniture, interior décor, and so forth. In such instance, the image features associated with electrical equipment, furniture and interior décor have higher weights assigned thereto, whereas the image feature associated with workspaces has a lower weight. Furthermore, a reference image that substantially communicates the theme 'eco-friendly' with respect to the image features of electrical equipment, furniture and interior décor will have a higher image score as compared to a reference image that communicates the theme with respect to the image feature of workspaces.

According to an embodiment, the method comprises scaling the weights assigned in a manner that a sum of weights that are assigned to image features of a given image is less than or equal to a predefined maximum number. In an example, the predefined maximum number is 100 and the sum of weights that are assigned to image features of a given image is expressed as a percentage value.

In one embodiment, determining of the image scores comprises calculating, for a given image, individual scores for feature groups into which image features of the given image are classified, wherein a given score of a given feature group is indicative of an extent to which a theme indicated by the given feature group is visually communicated by the given image. For example, an image of a premium restaurant is classified into feature groups 'modern', 'urban', 'eco-friendly' and 'luxury'. In such instance, individual scores for the feature groups 'modern', 'urban', 'eco-friendly' and 'luxury' are 35%, 28%, 12% and 25% respectively. It will be appreciated that in such instance, the individual scores of the given feature groups are indicative of the extent to which the theme indicated by the given feature group is visually communicated by the given image. For example, the feature group 'modern' with the image score 35% is indicated to the highest extent by the given image whereas the feature group 'eco-friendly' with the image score 12% is indicated to the lowest extent by the given image. In one embodiment, the individual scores for feature groups for an image are determined by comparison of the image with an image that has been determined to be indicative of a theme indicated by the given feature group to a maximum extent.

The method comprises iteratively performing the assigning of the weights and the determining of the image scores, wherein, for a given reference image, iterations of the assigning of the weights and the determining of the image score are performed based upon a comparison between the image score and ranking data of the given reference image. In an example, the ranking data of the given reference image is a reference value of an extent to which a theme indicated by a given feature group is visually communicated by the given reference image. Moreover, the ranking data may be obtained from one or more external sources.

According to an embodiment, the method further comprises obtaining the ranking data of the given reference image based upon at least one of expert opinions and ratings provided for the given reference image, consumer surveys performed for the given reference image, information collected for the given reference image using a brain-scanning method, an image analysis of the given reference image that is performed using a medical device, and/or a performance metric measured for the given reference image, when the given reference image is used in online advertising. In an example, the ranking data is obtained by consumer surveys of focus groups for determining their perception of a theme communicated by a reference image. In another example, consumers are surveyed for determining if an advertisement associated with a reference image (such as, in a newspaper, a hoarding, a television and so forth) increased their preference for purchasing a particular product and/or a service. In yet another example, the consumers are surveyed for determining a recollection of a reference image associated with an advertisement seen in offline media, including newspapers, hoardings, television advertisements, and so forth.

In one example, the ranking data is obtained by analysis of emotions triggered for the given reference image in one or more individuals who are subjected to a brain-scanning method (such as electroencephalogram). In another example, the ranking data is obtained based on an electrocardiogram response that is obtained from one or more individuals for the given reference image. Alternatively, the ranking data of the given reference image is obtained based upon analysis of information associated with a click through rate (CTR) for the given reference image, when the given reference image is used in online advertising.

The method comprises extracting image features from the at least one test image. In an example, the at least one test image comprises images used by one or more brands for visually communicating with a target audience, such as images used on a website associated with the brand, images used on a website associated with a competitor brand, images associated with the brand that are used on social media websites, images used by the brand for advertising, and so forth. In such instance, the at least one test image is retrieved by the processor from a database associated with the brand (such as a database associated with the website of the brand). For example, the processor is in communication with the database via a communication network. Furthermore, the image features are extracted from the at least one test image, for example, using automatic feature extraction techniques and/or manually, as mentioned herein above.

According to one embodiment, the test image comprises an image frame of a video. In an example, the test image could be associated with an instant of time (or a timestamp) in a video advertisement. In another example, the test image could be associated with a timestamp in a video captured by a camera associated with a mobile phone of a user.

The method comprises assigning weights to the image features of the at least one test image, based upon the weights assigned to the image features of the reference image. In one example, the at least one test image is used to visually communicate a similar theme as the reference image. In such instance, the test image will have one or more image features that are same as the image features of the reference image. Moreover, the weights that are assigned to the image features of the test image will be the same as the weights assigned to the image features of the reference image. For example, a reference image of premium apparel will have high weights assigned to image features such as colour black, lustrous surfaces and so forth. In such instance, a test image of premium apparel will also have high weights assigned to the image features of the colour black, lustrous surfaces and so forth, based upon the weights assigned to the image features of the reference image.

The method comprises determining an image score for the at least one test image, based upon the weights assigned to the image features of the at least one test image.

The method comprises providing an improvement proposal for the at least one test image, based upon the image score determined for the at least one test image. According to an embodiment, providing of the improvement proposal comprises providing a proposal to modify the at least one test image by removing at least one existing image feature therefrom, when the at least one existing image feature has a negative weight. In an example, an image with an 'industrial' theme has one or more image features associated with water, wherein the image feature of water has a negative weight. In such instance, an improvement proposal is provided that comprises a proposal to remove the existing image feature associated with water. Alternatively, providing of the improvement proposal comprises providing a proposal to modify the at least one test image by adding at least one missing image feature thereto, when the at least one missing image feature has a positive weight. In one example, an image with a 'natural' theme does not have image features associated with colour green and/or water, wherein the image features associated with the colour green and/or water have positive weights. In such instance, the improvement proposal provided comprises a proposal to add the missing feature associated with the colour green and/or water to the image.

According to one embodiment, the steps of the method executed by one or more processors for analyzing at least one test image are performed on a periodic basis. Such execution of the steps of the method on the periodic basis (such as every week, fortnight, month and so forth) enables updating of changes associated with the at least one image source, changes in reference images included in the image source, changes in ranking data associated with the reference images and so forth. In one embodiment, subsequent to the analysis of the at least one test image, the test image is included with the reference images according to one or more image features of the test image.

In one embodiment, the at least one test image is associated with images used by a person (or a group, a company and so forth) on one or more social media website accounts associated therewith, for communicating with a plurality of people (such as friends, fans, followers and so forth). In such instance, the test image associated with one or more earlier messages by the person is analysed to determine a theme that is visually communicated by the test image. Moreover, the reference images may comprise images used by other people on social media website accounts associated therewith. Alternatively, the test image comprises an image captured by a camera associated with the person and the test image is analysed prior to uploading thereof to the social media website account. In such instance, the improvement proposal is provided to the person that comprises a proposal to add (or remove) one or more image features to enable visual communication of a correct theme by the person with the plurality of people.

According to an embodiment, the at least one test image is associated with a captured image of food. In such instance, the test image of the food is analysed by comparison thereof against a reference image associated with one or more dietary goals of a person (such as a low calorific diet, high protein diet, heart-friendly diet and so forth). Furthermore, the improvement proposal that is provided to the person comprises a proposal to add and/or remove one or more food items (associated with one or more image features) to the food.

In an embodiment, the at least one test image is associated a mobile application (or "app"). In an example, the test image associated with the app comprises an image of an icon of the app, a screenshot of the app and so forth. In such instance, analysis of the test image is performed by comparison of the image features of test image with image features of reference images (such as images of icons, screenshots and so forth) associated with other apps. In one example, such analysis of the test image of the app is used to provide information of a target demographic (such as a demographic that is most likely to download the app, to find a visual style of the app appealing and so forth) for the app. Alternatively, the improvement proposal provided comprises a proposal to change one or more image features associated with the test image (or the app) to cater to a specific target demographic.

According to one embodiment, the at least one test image is associated with medical imaging. For example, the test image is associated with a patient and comprises at least one of, but not limited to, an X-ray image, a magnetic resonance imaging (MRI) image, a computer tomography (CT) image and so forth. In such instance, the reference images are associated with one or more healthy people. Furthermore, the test image is analysed with respect to the reference images, to determine presence one or more anomalies therein (such as presence of an abnormal growth). In one embodiment, the method comprises notifying at least one party about the at least one test image when the image score of the at least one test image is greater than or equal to a predefined threshold score. For example, the at least one party is a medical professional and the predefined threshold score is based on presence of image features associated with one or more anomalies. In such instance, the medical professional is notified about the presence of the one or more anomalies in the test image associated with the patient, when the image score of the at least one test image is greater than or equal to a predefined threshold score.

In an embodiment, the at least one test image is analysed to provide a style recommendation. For example, one or more image features are extracted from a captured test image associated with a person, wherein the test image is used to determine a personal style associated therewith. Subsequently, the style recommendation is provided to the person, wherein the style recommendation is associated with one or more reference images of people (and/or products) having the same personal style as the person. In another example, the at least one test image is associated with a home of the person. In such instance, the test image is analysed to provide a home style recommendation to the person.

According to one embodiment, the at least one test image is a captured image of an outdoor advertisement. In such instance, the test image is analysed to determine an environment associated with the outdoor advertisement. Furthermore, the improvement proposal comprises a proposal to modify the environment associated with the outdoor advertisement, to align the environment with a theme (such as 'natural', 'urban', 'energetic' and so forth) that is visually communicated by the outdoor advertisement.

The system comprises one or more processors for analyzing at least one test image, wherein the system comprises a data processing arrangement of software modules executing on the one or more processors. The system is operable to collect a plurality of reference images from at least one image source and extract image features from the plurality of reference images. The system is further operable to assign weights to the image features extracted and determine image scores for the plurality of reference images, wherein an image score for a given reference image is to be determined based upon the weights assigned to image features present in the given reference image. Moreover, the system is operable to iteratively perform the assigning of the weights and the determining of the image scores, wherein, for a given reference image, iterations of the assigning of the weights and the determining of the image score are to be performed based upon a comparison between the image score and ranking data of the given reference image. The system is operable to extract image features from the at least one test image and assign weights to the image features of the at least one test image, based upon the weights assigned to the image features. Moreover, the system is operable to determine an image score for the at least one test image, based upon the weights assigned to the image features of the at least one test image, and provide an improvement proposal for the at least one test image, based upon the image score determined for the at least one test image.

According to an embodiment, the system is operable to perform the aforementioned steps on a periodic basis.

In an embodiment, when extracting the image features, the system is operable to divide a given image into a plurality of sub-images, and to analyze the plurality of sub-images to identify the image features present therein.

According to an embodiment, when providing the improvement proposal, the system is operable to provide a proposal to modify the at least one test image by removing at least one existing image feature therefrom, when the at least one existing image feature has a negative weight. Alternatively, when providing the improvement proposal, the system is operable to provide a proposal to modify the at least one test image by adding at least one missing image feature thereto, when the at least one missing image feature has a positive weight.

In one embodiment, the system is operable to obtain the ranking data of the given reference image based upon at least one of expert opinions and ratings provided for the given reference image, consumer surveys performed for the given reference image, information collected for the given reference image using a brain-scanning method, an image analysis of the given reference image that is performed using a medical device, and/or a performance metric measured for the given reference image, when the given reference image is used in online advertising.

In an embodiment, the system is operable to classify the image features into a plurality of feature groups based upon mutually different genres to which the plurality of reference images and/or the at least one test image belong.

According to one embodiment, the system is operable to predefine the plurality of feature groups in a manner that the plurality of feature groups are understandable and interpretable by humans, wherein a given feature group is indicative of a theme that is visually communicated by a given image.

In an embodiment, when determining the image scores, the system is operable to calculate, for a given image, individual scores for feature groups into which image features of the given image are classified, wherein a given score of a given feature group is indicative of an extent to which a theme indicated by the given feature group is visually communicated by the given image.

In one embodiment, the system is operable to scale the weights assigned in a manner that a sum of weights that are assigned to image features of a given image is less than or equal to a predefined maximum number.

In an embodiment, the system is operable to notify at least one party about the at least one test image when the image score of the at least one test image is greater than or equal to a predefined threshold score.

A computer program product comprising a non-transitory machine-readable data storage medium having stored thereon program instructions that, when accessed by a processing device, cause the processing device to collect a plurality of reference images from at least one image source, extract image features from the plurality of reference images, assign weights to the image features extracted, determine image scores for the plurality of reference images, wherein an image score for a given reference image is to be determined based upon the weights assigned to image features present in the given reference image, iteratively perform the assigning of the weights and the determining of the image scores), wherein, for a given reference image, iterations of the assigning of the weights and the determining of the image score are to be performed based upon a comparison between the image score and ranking data of the given reference image, extract image features from the at least one test image, assign weights to the image features of the at least one test image, based upon the weights assigned to the image features, determine an image score for the at least one test image, based upon the weights assigned to the image features of the at least one test image, and provide an improvement proposal for the at least one test image, based upon the image score determined for the at least one test image.

The method and system of the present disclosure enable analysis of test images based on comparison of the image score thereof with image scores of a plurality of reference images. Furthermore, the image scores are calculated based on weights assigned to various image features of the reference images. Such assigning of the weights enables accurate comparison of the test image with the reference images, and enables selection of effective images for visual communication. Additionally, the weights are iteratively assigned, thereby allowing one or more reference images to be used for analysis of multiple test images by assigning different weights to various features of the images. Furthermore, the image scores for the reference images are iteratively determined based on comparison between images scores thereof and ranking data. Such comparison of the image scores with the ranking data enables updating of image scores based on changes in the ranking data associated with the reference images, thereby keeping the system up-to-date. Moreover, the method and system enable to provide an improvement proposal for the test image based on an image score thereof.

Such improvement proposal enables selection of appropriate test images for visual communication and further enables to substantially overcome drawbacks associated with conventional selection of images for visual communication.

DETAILED DESCRIPTION OF THE DRAWINGS

FIG. 1 is an illustration of an example network environment 100 in which a system 102 for analysing at least one test image is implemented, in accordance with an embodiment of the present disclosure. As shown, the network environment 100 includes the system 102, one or more databases 104 and 106 associated with the system 102, one or more image sources 108 and 110, and a client system 112. The system 102 is communicably coupled to the one or more databases 104-106, image sources 108-110, and the client system 112, for example, via a communication network or via a direct connection. The system 102 is operable to collect a plurality of reference images from the at least one image source of the image sources 108-110. The system 102 is further operable to extract image features from the plurality of reference images and assign weights to the image features extracted. Moreover, the system 102 is operable to determine image scores for the plurality of reference images. Optionally, the system 102 is operable to collect a ranking data associated with the plurality of reference images from the one or more image sources 108-110. The ranking data is stored in the one or more databases 104-106. The system 102 is operable to iteratively perform the assigning of the weights and the determining of the image scores, wherein, for a given reference image, iterations of the assigning of the weights and the determining of the image score are performed based upon a comparison between the image score and ranking data of the given reference image. Moreover, the system 102 is operable to collect at least one test image from the client system 112. The system 102 is operable to extract image features from the at least one test image, assign weights to the image features of the at least one test image and determine an image score for the at least one test image. Additionally, the system 102 is operable to provide an improvement proposal for the at least one test image to the client system 112, based upon the image score determined for the at least one test image.

Figure 2A:
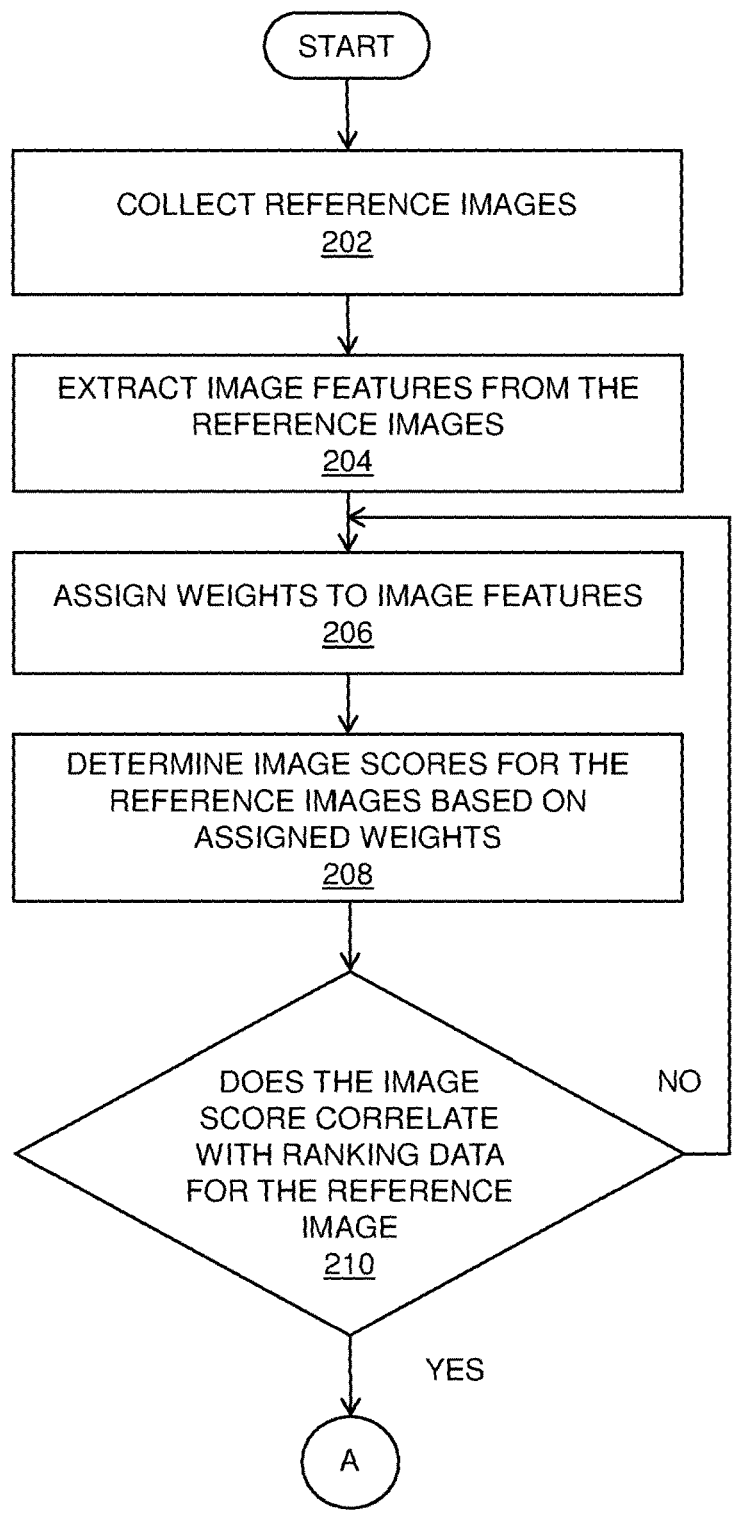
FIGS. 2A, 2B and 2C collectively are an illustration of steps of a method for analysing at least one test image, in accordance with an embodiment of the present disclosure.
Figure 2B:
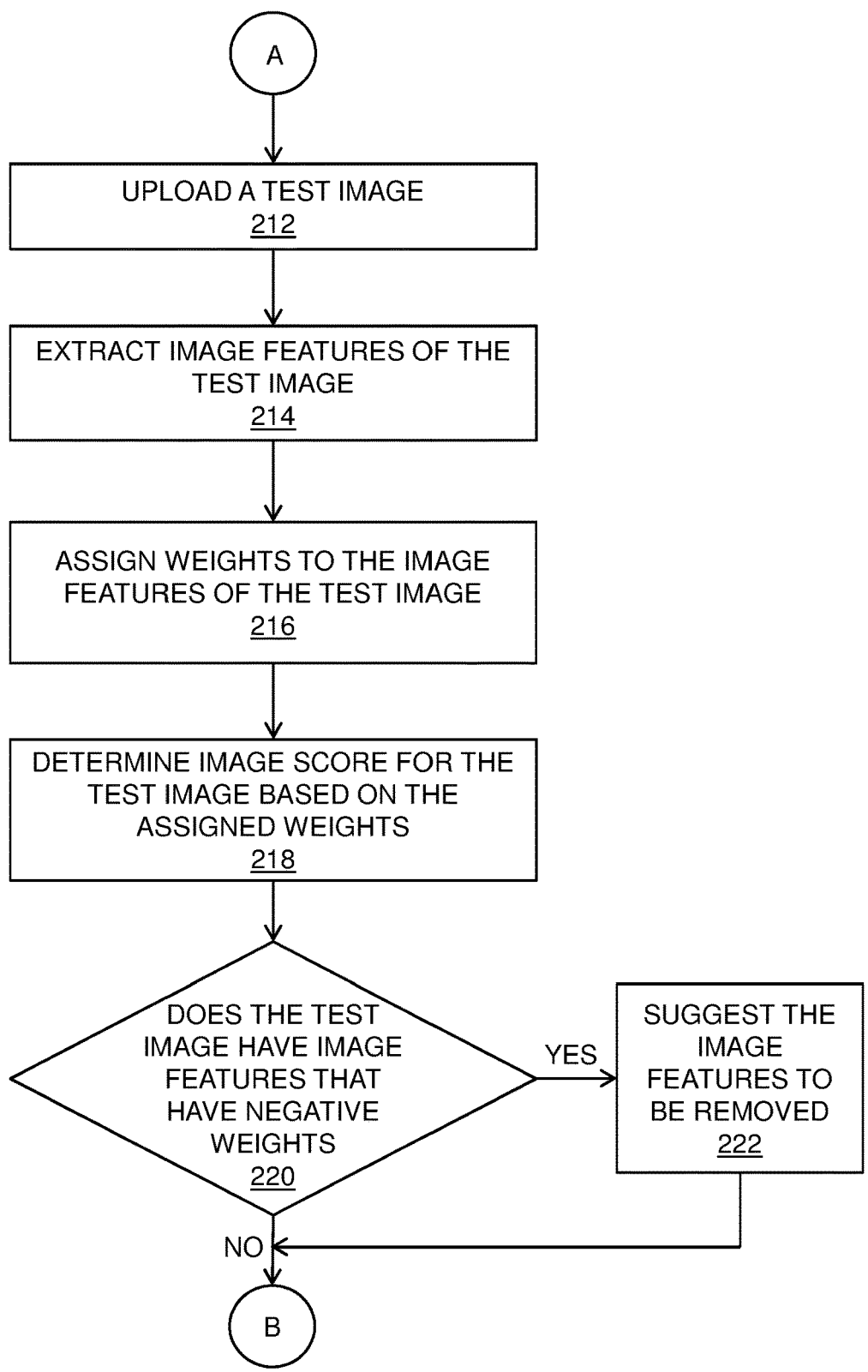
Figure 2C:
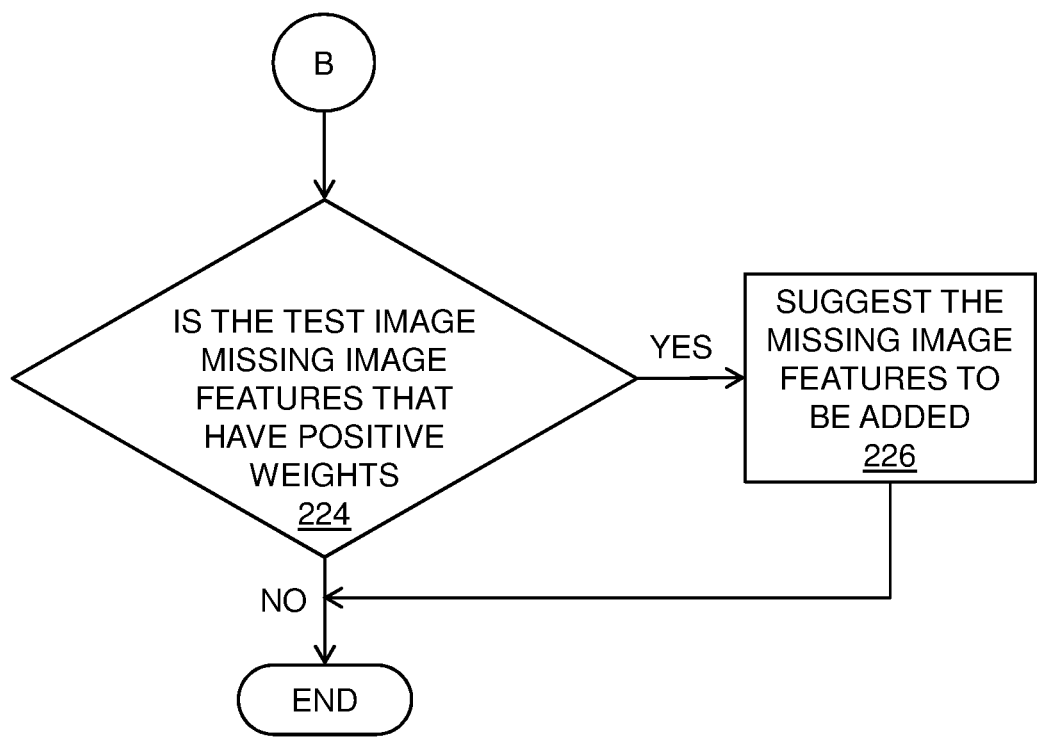

FIGS. 2A, 2B and 2C collectively are an illustration of steps of a method for analysing at least one test image, in accordance with an embodiment of the present disclosure. The method is depicted as a collection of steps in a logical flow diagram, which represents a sequence of steps that can be implemented using hardware, software, or a combination thereof. At step 202, a plurality of reference images are collected. At a step 204, image features are extracted from the plurality of reference images collected at step 202. Next, at step 206, weights are assigned to the images features of the plurality of reference images. Subsequently, at step 208, image scores for the reference images are determined based on weights assigned to the images features at step 206. At step 210, it is determined whether an image score of a given reference image correlates with ranking data of the given reference image. If it is determined that the image score of the given reference image does not correlate with the ranking data thereof, the step 206 is repeated. Else, at step 212, at least one test image is uploaded. At step 214, image features of the at least one test image are extracted. At step 216, weights are assigned to the image features of the test image. At a step 218, for each test image, an image score is determined based on weights that are assigned to the features of the test image. At a step 220, it is determined if the test image has image features that represent negative weights. If it is determined that the test image has the image features that represent negative weights, at step 222, the image features are suggested to be removed. Else, at step 224, it is determined if the test image is missing image features that represent positive weights. If it is determined that the test image is missing the image features that have positive weights, at step 226, the missing image feature is suggested to be added to the test image in an improvement proposal.

The steps 202 to 226 are only illustrative and other alternatives can also be provided where one or more steps are added, one or more steps are removed, or one or more steps are provided in a different sequence without departing from the scope of the claims herein. For example, the method comprises additional steps wherein a given image is divided into a plurality of sub-images and the plurality of sub-images are analyzed to identify the image features present therein.

Figure 3:
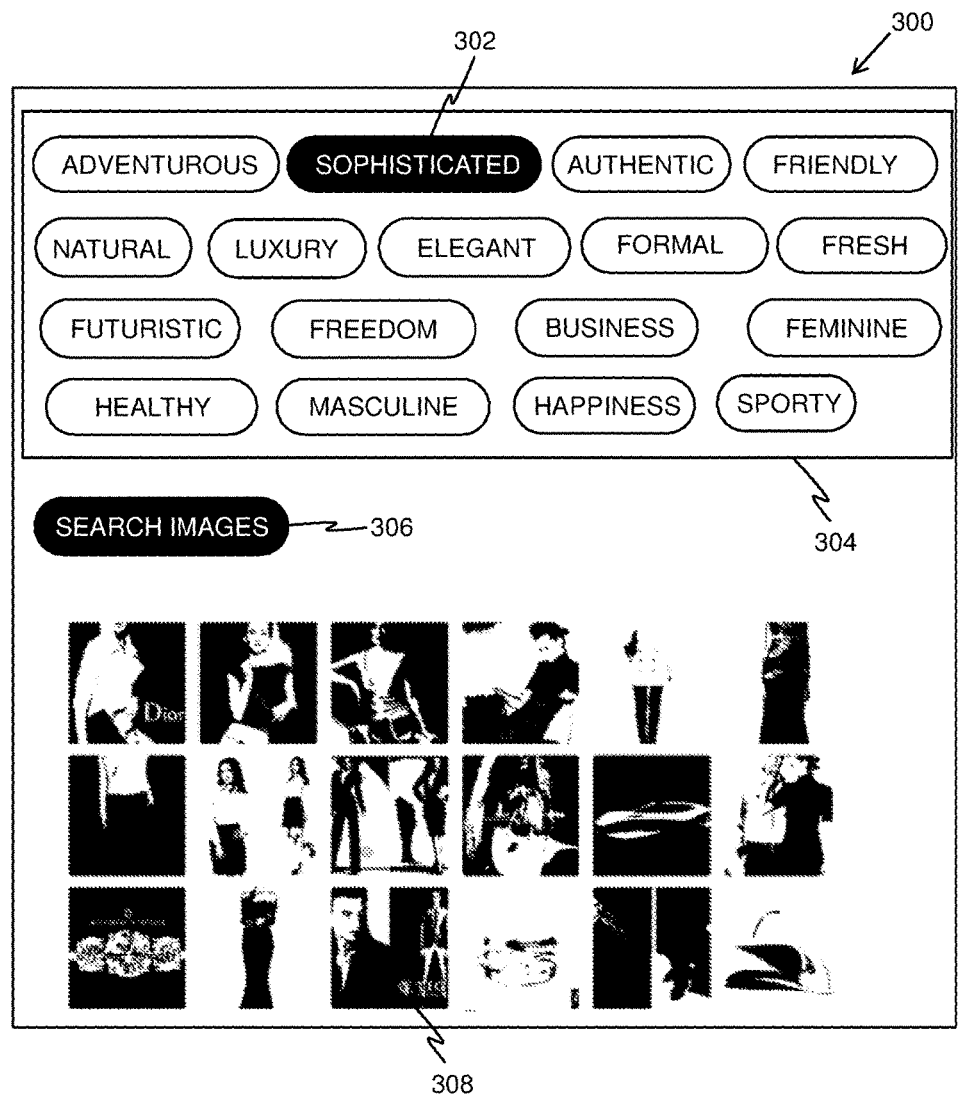
FIG. 3 is an illustration of an exemplary user interface for selecting a feature group, in accordance with an embodiment of the present disclosure.

FIG. 3 is an illustration of an exemplary user interface 300 for selecting a feature group, in accordance with an embodiment of the present disclosure. As shown, the user interface 300 comprises a plurality of feature groups 304 that can be selected by a user (for example, by clicking thereon), a button 306 to enable a user to search images associated with a selected feature group and an area 308 for displaying one or more searched images. As shown, a feature group 302 is selected that is indicative of a theme 'Sophisticated'. Furthermore, upon using the button 306, a plurality of images having image features corresponding to the 'Sophisticated' feature group 302 are displayed in the area 308.

Figure 4:
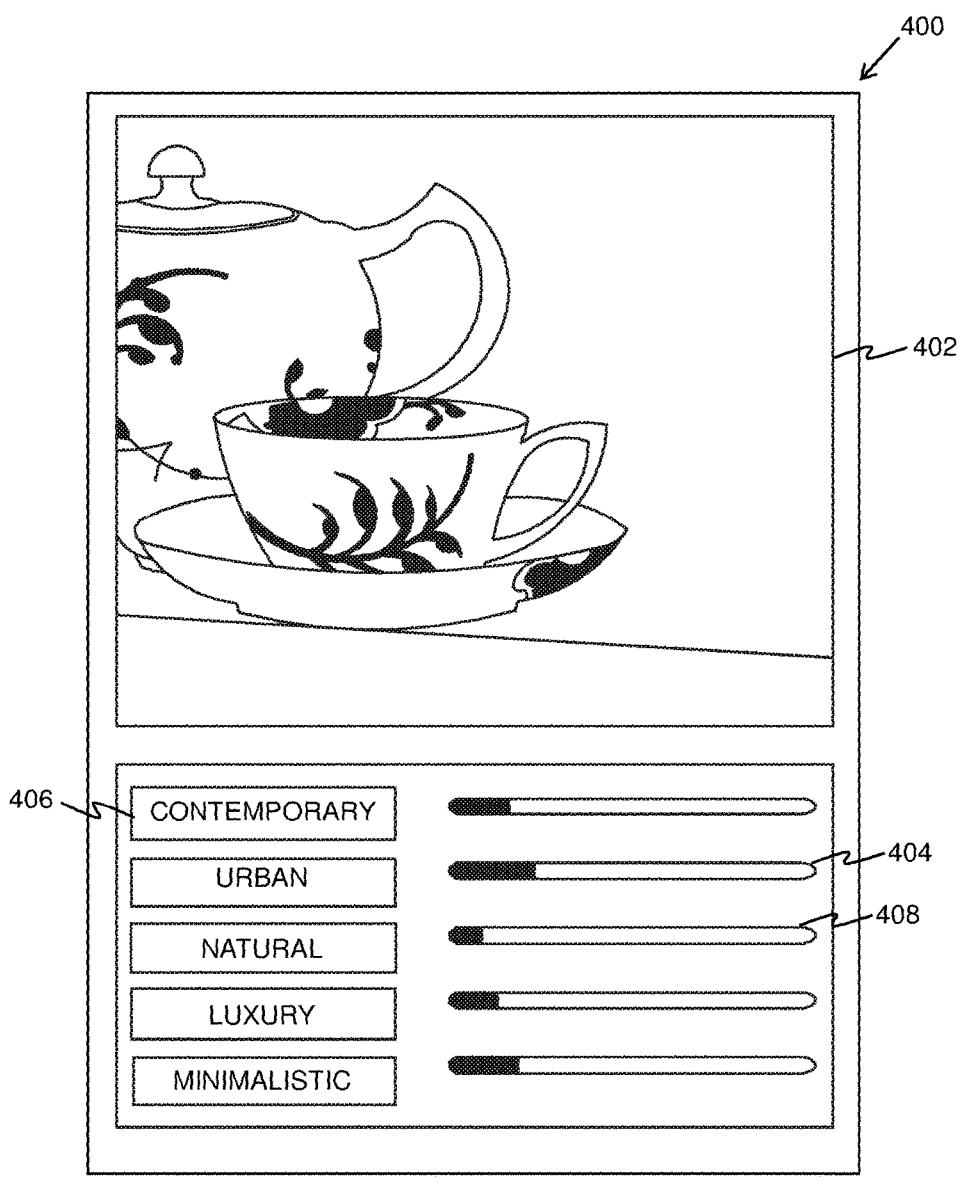
FIG. 4 is an illustration of a test image and individual scores for feature groups into which image features of the test image are classified, in accordance with an embodiment of the present disclosure.

FIG. 4 is an illustration of a test image 402 and individual scores 404 for feature groups 406 into which image features of the test image 402 are classified, in accordance with an embodiment of the present disclosure. The given score 404 of given feature group 406 is indicative of an extent to which a theme indicated by the given feature group 406 is visually communicated by the given image 402. As shown, the given image 402 is indicative of the feature group 'Urban' to a high extent. However, the given image 402 is indicative of the feature group 'Natural' to a low extent.

Figure 5:
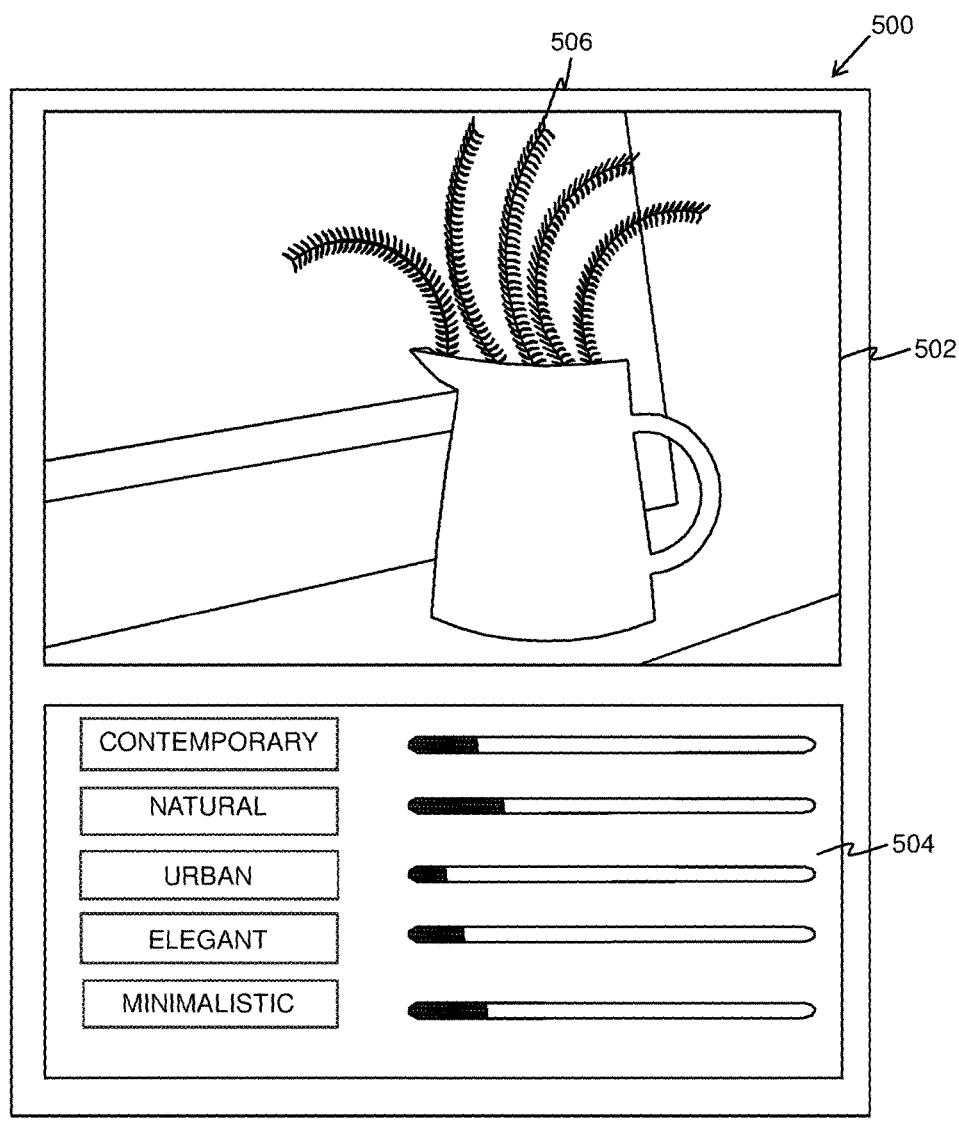
FIG. 5 is an illustration of an improvement proposal for the test image, based upon the image score determined for the test image, in accordance with an embodiment of the present disclosure.

FIG. 5 is an illustration of an improvement proposal 500 for the test image 402, based upon the image score determined for the test image 402, in accordance with an embodiment of the present disclosure. As shown, the improvement proposal 500 comprises a proposal to modify the test image 402 by adding at least one missing image 506 associated with the feature group 'Natural', wherein the at least one missing image feature 506 has a positive weight.

Figure 6A:
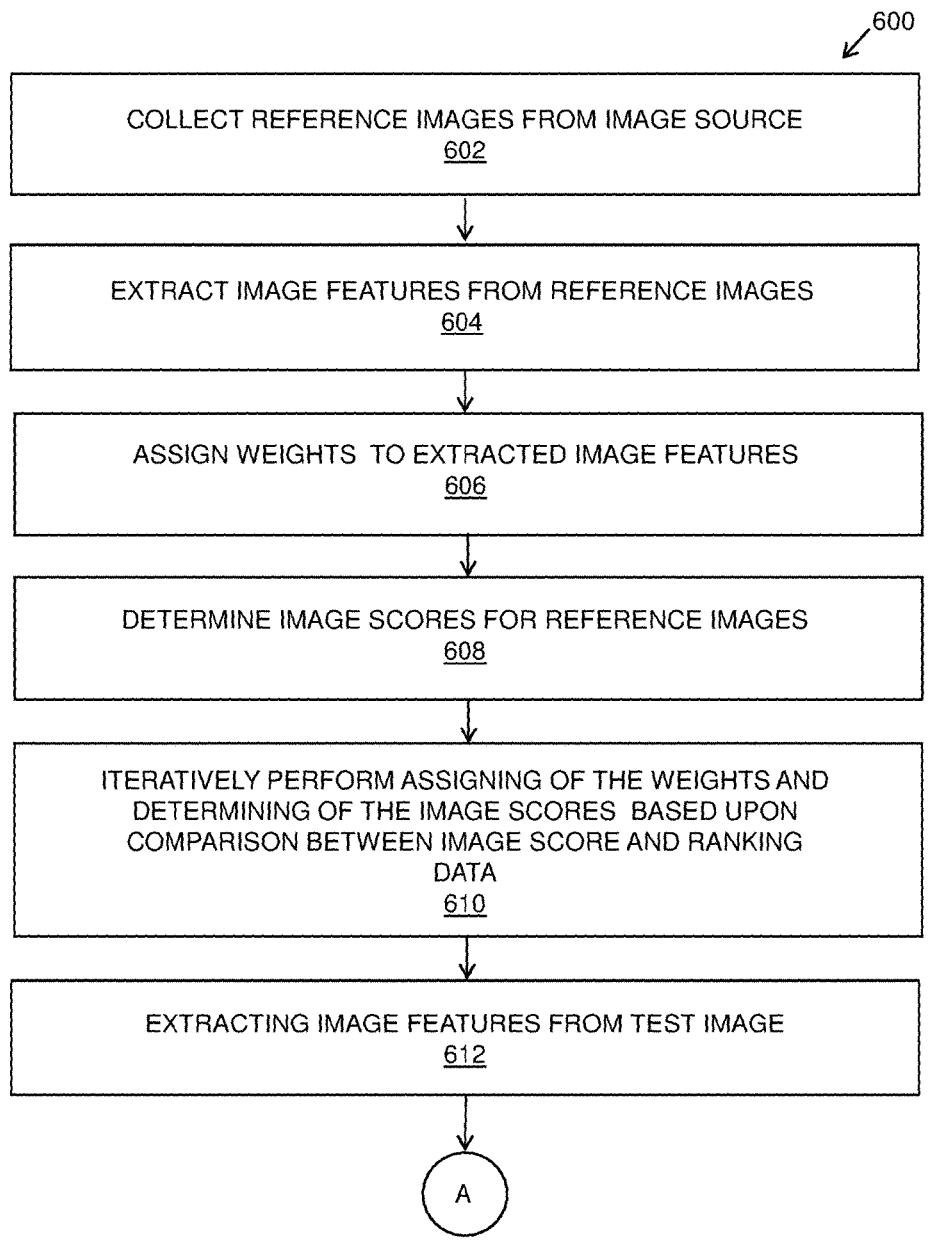
FIGS. 6A and 6B illustrate steps of a method executed by one or more processors for analyzing at least one test image, in accordance with an embodiment of the present disclosure.
Figure 6B:
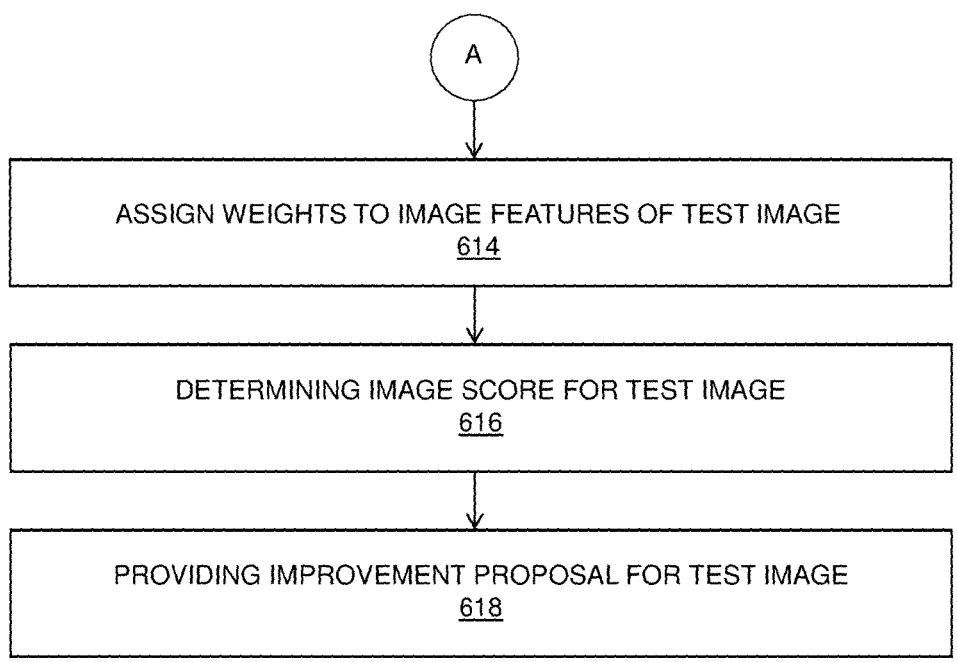

FIGS. 6A and 6B illustrate steps of a method 600 for analyzing at least one test image, in accordance with an embodiment of the present disclosure. At step 602, a plurality of reference images from at least one image source are collected. At step 604, image features from the plurality of reference images are extracted. At step 606, weights are assigned to the image features extracted from the plurality of reference images. At step 608, image scores for the plurality of reference images are determined. Specifically, the image score for a given reference image are determined based upon the weights assigned to image features present in the given reference image. At step 610, assigning of the weights at the step 606 and determining the image score at step 608, are iteratively performed. For a given reference image, iterations of the assigning of the weights at the step 606 and the determining of the image score at the step 608 are performed based upon a comparison between the image score and ranking data of the given reference image. At step 612 image features from the at least one test image are extracted. At step 614, weights to the image features of the at least one test image are assigned, based upon the weights assigned to the image features at the step 610. At step 616, an image score for the at least one test image are determined. The image score is determined based upon the weights assigned to the image features of the at least one test image. At step 618, an improvement proposal for the at least one test image is provided, based upon the image score determined for the at least one test image.

The steps 602 to 618 are only illustrative and other alternatives can also be provided where one or more steps are added, one or more steps are removed, or one or more steps are provided in a different sequence without departing from the scope of the claims herein. In an example, extracting of the image features at the step 604 and/or the step 612 comprises dividing a given image into a plurality of sub-images; and analyzing the plurality of sub-images to identify the image features present therein. In another example, providing of the improvement proposal at the step 618 comprises providing a proposal to modify the at least one test image by removing at least one existing image feature therefrom, when the at least one existing image feature has a negative weight. Alternatively, providing of the improvement proposal at the step 618 comprises providing a proposal to modify the at least one test image by adding at least one missing image feature thereto, when the at least one missing image feature has a positive weight. In an example, the method further comprises obtaining the ranking data of the given reference image based upon at least one of expert opinions and ratings provided for the given reference image, consumer surveys performed for the given reference image, information collected for the given reference image using a brain-scanning method, an image analysis of the given reference image that is performed using a medical device, and/or a performance metric measured for the given reference image, when the given reference image is used in online advertising. In another example, the method further comprises classifying the image features into a plurality of feature groups based upon mutually different genres to which the plurality of reference images and/or the at least one test image belong. In yet another example, the method further comprises predefining the plurality of feature groups in a manner that the plurality of feature groups are understandable and interpretable by humans, wherein a given feature group is indicative of a theme that is visually communicated by a given image. In one example, determining of the image scores at the step 608 and/or the step 616 comprises calculating, for a given image, individual scores for feature groups into which image features of the given image are classified, wherein a given score of a given feature group is indicative of an extent to which a theme indicated by the given feature group is visually communicated by the given image. In another example, the method further comprises scaling the weights assigned at the step 606 and/or the step 614 in a manner that a sum of weights that are assigned to image features of a given image is less than or equal to a predefined maximum number. In yet another example, the steps 602 to 618 are performed on a periodic basis. In one example, the method further comprises notifying at least one party about the at least one test image when the image score of the at least one test image is greater than or equal to a predefined threshold score.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method executed by one or more processors for analyzing and modifying at least one test image, the method comprising:
(a) collecting a plurality of reference images from at least one image source;
(b) extracting image features from the plurality of reference images;
(c) assigning weights to the image features extracted at the step (b);
(d) determining image scores for the plurality of reference images, wherein an image score for a given reference image is determined based upon the weights assigned to image features present in the given reference image;
(e) iteratively performing the assigning of the weights at the step (c) and the determining of the image scores at the step (d), wherein, for a given reference image, iterations of the assigning of the weights at the step (c) and the determining of the image score at the step (d) are performed based upon a comparison between the image score and ranking data of the given reference image;
(f) extracting image features from the at least one test image;
(g) assigning weights to the image features of the at least one test image, based upon the weights assigned to the image features at the step (e);
(h) determining an image score for the at least one test image, based upon the weights assigned to the image features of the at least one test image;
(i) providing an improvement proposal for the at least one test image, based upon the image score determined for the at least one test image; and
modifying the at least one test image based on the improvement proposal prior to visual communication of the at least one test image.

2. The method according to claim 1, wherein the extracting of the image features at the step (b) and/or the step (f) comprises dividing a given image into a plurality of sub-images; and analyzing the plurality of sub-images to identify the image features present therein.

3. The method according to claim 1, wherein the providing of the improvement proposal at the step (i) comprises providing a proposal to modify the at least one test image by removing at least one existing image feature therefrom, when the at least one existing image feature has a negative weight and the method comprises modifying the at least one test image by removing the at least one existing image feature therefrom.

4. The method according to claim 1, wherein the providing of the improvement proposal at the step (i) comprises providing a proposal to modify the at least one test image by adding at least one missing image feature thereto, when the at least one missing image feature has a positive weight and the method comprises modifying the at least one test image by adding the at least one existing image feature thereto.

5. The method according to claim 1, further comprising obtaining the ranking data of the given reference image based upon at least one of:
(i) expert opinions and ratings provided for the given reference image, (ii) consumer surveys performed for the given reference image,
(iii) information collected for the given reference image using a brain-scanning method,
(iv) an image analysis of the given reference image that is performed using a medical device,
(v) a performance metric measured for the given reference image, when the given reference image is used in online advertising.

6. The method according to claim 1, further comprising classifying the image features into a plurality of feature groups based upon mutually different genres to which the plurality of reference images and/or the at least one test image belong.

7. The method according to claim 6, further comprising predefining the plurality of feature groups in a manner that the plurality of feature groups are understandable and interpretable by humans, wherein a given feature group is indicative of a theme that is visually communicated by a given image.

8. The method according to claim 6, wherein the determining of the image scores at the step (d) and/or the step (h) comprises calculating, for a given image, individual scores for feature groups into which image features of the given image are classified, wherein a given score of a given feature group is indicative of an extent to which a theme indicated by the given feature group is visually communicated by the given image.

9. The method according to claim 1, further comprising scaling the weights assigned at the step (c) and/or the step (g) in a manner that a sum of weights that are assigned to image features of a given image is less than or equal to a predefined maximum number.

10. The method according to claim 1, wherein the steps (a) to (i) are performed on a periodic basis.

11. The method according to claim 1, further comprising notifying at least one party about the at least one test image when the image score of the at least one test image is greater than or equal to a predefined threshold score.

12. A system comprising one or more processors for analyzing at least one test image, wherein the system comprises a data processing arrangement of software modules executing on the one or more processors, and wherein the system is operable to:
(a) collect a plurality of reference images from at least one image source;
(b) extract image features from the plurality of reference images;
(c) assign weights to the image features extracted at (b);
(d) determine image scores for the plurality of reference images, wherein an image score for a given reference image is to be determined based upon the weights assigned to image features present in the given reference image;
(e) iteratively perform the assigning of the weights at (c) and the determining of the image scores at (d), wherein, for a given reference image, iterations of the assigning of the weights at (c) and the determining of the image score at (d) are to be performed based upon a comparison between the image score and ranking data of the given reference image;
(f) extract image features from the at least one test image;
(g) assign weights to the image features of the at least one test image, based upon the weights assigned to the image features at (e);
(h) determine an image score for the at least one test image, based upon the weights assigned to the image features of the at least one test image;
(i) provide an improvement proposal for the at least one test image, based upon the image score determined for the at least one test image; and
modifying the at least one test image based upon the improvement proposal.

13. The system according to claim 12, wherein, when extracting the image features at (b) and/or (f), the system is operable to divide a given image into a plurality of sub-images, and to analyze the plurality of sub-images to identify the image features present therein.

14. The system according to claim 12, wherein, when providing the improvement proposal at (i), the system is operable to provide a proposal to modify the at least one test image by removing at least one existing image feature therefrom, when the at least one existing image feature has a negative weight and the system is configured to modify the at least one test image by removing the at least one existing image feature with the negative weight.

15. The system according to claim 12, wherein, when providing the improvement proposal at (i), the system is operable to provide a proposal to modify the at least one test image by adding at least one missing image feature thereto, when the at least one missing image feature has a positive weight and the system is configured to modify the at least one test image by adding the at least one missing feature with the positive weight thereto.

16. The system according to claim 12, wherein the system is operable to obtain the ranking data of the given reference image based upon at least one of:
(i) expert opinions and ratings provided for the given reference image,
(ii) consumer surveys performed for the given reference image,
(iii) information collected for the given reference image using a brain-scanning method,
(iv) an image analysis of the given reference image that is performed using a medical device,
(v) a performance metric measured for the given reference image, when the given reference image is used in online advertising.

17. The system according to claim 12, wherein the system is operable to classify the image features into a plurality of feature groups based upon mutually different genres to which the plurality of reference images and/or the at least one test image belong.

18. The system according to claim 17, wherein the system is operable to predefine the plurality of feature groups in a manner that the plurality of feature groups are understandable and interpretable by humans, wherein a given feature group is indicative of a theme that is visually communicated by a given image.

19. The system according to claim 17, wherein, when determining the image scores at (d) and/or (h), the system is operable to calculate, for a given image, individual scores for feature groups into which image features of the given image are classified, wherein a given score of a given feature group is indicative of an extent to which a theme indicated by the given feature group is visually communicated by the given image.

20. The system according to any of claim 12, wherein the system is operable to scale the weights assigned at (c) and/or (g) in a manner that a sum of weights that are assigned to image features of a given image is less than or equal to a predefined maximum number.

21. The system according to claim 12, wherein the system is operable to perform (a) to (i) on a periodic basis.

22. The system according to claim 12, wherein the system is operable to notify at least one party about the at least one test image when the image score of the at least one test image is greater than or equal to a predefined threshold score.

23. A computer program product comprising a non-transitory machine-readable data storage medium having stored thereon program instructions that, when accessed by a processing device, cause the processing device to:
 (a) collect a plurality of reference images from at least one image source;
 (b) extract image features from the plurality of reference images;
 (c) assign weights to the image features extracted at (b);
 (d) determine image scores for the plurality of reference images, wherein an image score for a given reference image is to be determined based upon the weights assigned to image features present in the given reference image;
 (e) iteratively perform the assigning of the weights at (c) and the determining of the image scores at (d), wherein, for a given reference image, iterations of the assigning of the weights at (c) and the determining of the image score at (d) are to be performed based upon a comparison between the image score and ranking data of the given reference image;
 (f) extract image features from the at least one test image;
 (g) assign weights to the image features of the at least one test image, based upon the weights assigned to the image features at (e);
 (h) determine an image score for the at least one test image, based upon the weights assigned to the image features of the at least one test image; and
 (i) provide an improvement proposal for the at least one test image, based upon the image score determined for the at least one test image; and
   modify the at least one test image based upon the improvement proposal.

\* \* \* \* \*